Patented July 9, 1935

2,007,950

UNITED STATES PATENT OFFICE 2,007,950

MANUFACTURE OF CELLULOSE DERIVATIVES

Henry Dreyfus, London, England

No Drawing. Application October 30, 1930, Serial No. 492,363. In Great Britain November 28, 1929.

24 Claims. (Cl. 260—101)

This invention relates to the manufacture of nitrogen containing cellulose derivatives from cellulose esters or ethers containing hydroxy groups, present for example in the form of alcoholic groups or carboxylic acid groups.

In my U. S. Patent No. 1,502,379 and my U. S. application S. No. 162,214, filed 19th January, 1927, I have described the production of cellulose ethers by introducing into the cellulose molecule one or more residues of glycols or of other polyhydric alcohols, and in my U. S. application S. No. 348,980, filed 21st March, 1929, now Patent No. 1,947,463, Feb. 20, 1934, and my British specification No. 320,842, the production of cellulose esters of hydroxy aliphatic acids, for example glycollic acid. Again in my British application No. 35,501/29, dated 20th November, 1929, and corresponding U. S. application S. No. 492,085 filed October 29, 1930, now Patent No. 1,884,629, Oct. 25, 1932, processes are described for the production of the higher carboxy-alkylated derivatives of cellulose.

According to the present invention cellulose derivatives containing hydroxy groups, e. g. simple hydroxy groups or carboxy groups, are treated so as to replace one or more of the hydroxy groups by amino or substituted amino groups.

The substitution may be effected directly by simple treatment of the hydroxy containing cellulose ester or ether with ammonia or with a primary or secondary aliphatic, aromatic or other organic amine or with salts of ammonia or amines, if desired or requisite in the presence of an acidic reagent such as sulphur dioxide. For example hydroxy containing cellulose ethers may be treated under pressure with ammonia or with an alkylamine with or without sulphur dioxide. In the case of cellulose esters the simultaneous presence of sulphur dioxide or other acidic reagent may serve to prevent saponification of the ester. Cellulose derivatives containing a carboxy group may be simply heated in the form of their ammonium or amino salts to effect the substitution or alternatively the free cellulose carboxy acid or a salt or ester thereof may be heated with ammonia or an amine or salts thereof.

The substitution of the hydroxy groups by amino or substituted amino groups is preferably effected in two stages, by first substituting the hydroxy groups by halogen atoms and then replacing the halogen atoms by the required amino or substituted amino groups. The halogenation of the hydroxy containing cellulose esters or ethers may be effected by any method suitable for the halogenation of alcoholic groups or for the conversion of carboxylic acids into acid halides, preferably a method which does not result in substantial degradation of the cellulose derivative. A method which is particularly valuable in that it may be employed at ordinary temperatures or at temperatures only slightly above atmospheric temperature is a simple treatment of the hydroxy-containing cellulose derivative with thionyl chloride.

The cellulose ester or ether, for example cellulose glycollate, hydroxy ethyl cellulose, or cellulose glycollic acid (carboxymethyl cellulose) may be treated with the thionyl chloride directly or in presence of a solvent for the cellulose ester or ether or in presence of a non-solvent diluent. The action may if desired be accelerated by heating, but preferably the temperature is not allowed to exceed about 50 to 60° C.

The halogenated cellulose derivatives obtained from carboxy esters or ethers of cellulose or from hydroxy ethers of cellulose are new products, and their production forms an important part of the present invention. The halogenated cellulose esters obtained from cellulose esters of hydroxy acids may on the other hand be the same products as are obtained according to my prior British specification No. 320,842 by treatment of cellulose with halogen containing aliphatic acid anhydrides.

The substitution by amino or substituted amino groups of the chlorine or other halogen atoms in the cellulose derivatives may be effected by methods similar to those described in my prior British specification No. 320,842, wherein amino or substituted amino aliphatic acidyl derivatives of cellulose are produced by the action of ammonia or organic amines on chlor or brom acidyl derivatives of cellulose. For example the halogenated cellulose ester or ether may be treated with ammonia, preferably under pressure, or may be boiled with an aliphatic or aromatic amine in presence of a solvent or non-solvent diluent for the cellulose ester or ether treated.

The present invention further includes treating the new cellulose derivatives containing carboxylic acid amide groups so as to convert them into simple amino derivatives. This conversion may be effected by treating the acid amide derivatives with hypochlorites or hypobromites or with alkali and chlorine or bromine and is preferably carried out at low or relatively low temperatures. For example an aqueous suspension of the acid amide derivative obtainable from cellulose glycollic acid, e. g. by treatment with thionyl chloride and then with ammonia, may be stirred into a cooled aqueous liquor containing bleaching powder and slaked lime and sodium carbonate then added.

All the nitrogen containing cellulose derivatives obtained according to the present invention are characterized by a strong affinity for acid wool dyestuffs, whereas as is well known cellulose acetate or other cellulose esters have little or no affinity for these dyestuffs. Derivatives containing primary or secondary amino groups may, if desired, be alkylated or further alkylated or aralkylated after their preparation, for example by treatment with ethyl chloride or other ethylating or other alkylating agent, for example para toluene sulphonic methyl ester or they may be acylated for example by treatment with acid chlorides or anhydrides, e. g. acetic anhydride, para toluene sulpho-chloride and the like. Where the initial cellulose derivatives are not completely etherified or esterified such subsequent etherification or acylation may result in an etherification or esterification of the remaining hydroxy groups in the cellulose molecule. Again in the case of the amino or substituted amino groups replacing only a part of the hydroxy groups in the ester or ether radicles, the remaining hydroxy groups may be esterified or etherified in such a subsequent treatment.

The products of the present invention may be utilized for the preparation of films or plastic materials or for the manufacture of artificial filaments or threads or for other purposes to which cellulose acetate or other cellulose derivatives have in the past been applied. By effecting the reactions in presence of non-solvents and by starting with cellulose derivatives having the fibrous structure of cellulose, halogenated and amidated derivatives having a fibrous structure may be produced. This is of advantage in the treatment of fabrics and also yarns which may be used for effect purposes in association with cotton or the cellulosic type of artificial silk or with cellulose acetate or other cellulose esters having little or no affinity for acid dyestuffs.

The following examples show the best methods known to me for carrying the invention into effect, but they are not to be considered as limiting the invention in any way:

Example 1

Cellulose glycollic acid, for example that obtained according to my prior British specification No. 35,501/29 and corresponding U. S. application S. No. 492,085 filed October 29, 1930, now Patent No. 1,884,629, Oct. 25, 1932, is dissolved or suspended in about 10 times its weight of benzene and treated with about 1¼ times its own weight of thionyl chloride in the case of an ether containing 2½–3 ether groups or a correspondingly smaller quantity with a lower ether. The mixture is at first gently warmed and is maintained at a temperature of 25–35° C. After 20–30 minutes the excess of thionyl chloride and the benzene are removed under vacuum and the cellulose derivative washed cautiously with ligroin.

The chlorinated product is then heated in a closed container with excess of concentrated ammonia solution at a temperature of 100–110° C.

The product, which contains nitrogen, is soluble in acetone and acetic acid and is insoluble in ether and ligroin. It has a strong affinity for acid dyestuffs.

Example 2

Hydroxyethyl cellulose or other hydroxyalkylated cellulose, obtained for example by the processes described in my prior U. S. Patent No. 1,502,379, and my U. S. application S. No. 162,214, filed 19th January, 1927, is treated as described in Example 1. The product has similar properties.

Example 3

A carboxy ester of cellulose, e. g. cellulose malonate, cellulose phthalate, cellulose malate or cellulose maleate, obtained for instance by the action of the corresponding acid on cellulose in presence of chloracetic anhydride, is treated with thionyl chloride as described in Example 1. The product is then heated with excess of aniline under a reflux condenser for half an hour during which the mixture is boiled. At the end of this period, the mixture is allowed to cool and the cellulose derivative precipitated and washed with water. It is somewhat less basic than the product of Examples 1 and 2, but still has a pronounced affinity for acid dyestuffs.

Example 4

The ammonium salt of cellulose glycollic acid or of the oxalic or maleic acid ester of cellulose, the mineral acid content of which has been reduced as much as possible or preferably which has been prepared in the absence of a mineral acid catalyst, is finely powdered and suspended in 5 to 10 times its weight of distilled anthracene oil. The suspension is then heated to a temperature of 180–220° C. with stirring for 4 to 7 hours. The lower temperature is preferable in the case of a cellulose ester prepared in presence of mineral acid and it may even be advisable to reduce the temperature somewhat and heat for a longer period. The cellulose derivative is separated from the anthracene oil and washed with petroleum ether. The products, which are the amides corresponding to the original ammonium salts, have similar properties to the product of Example 1, account being taken of the fact that the product from the maleic or oxalic derivative is an ester.

Example 5

240 parts of lime, slaked in 400–500 parts of water are mixed with a cooled aqueous solution of 182 parts of bleaching powder. 100 parts of the product of Example 1, obtained from a highly etherified starting material, are finely ground, suspended in 250 parts of water and added slowly while stirring to the bleaching powder and slaked lime, the temperature during the addition being maintained at 0–10° C. 280 parts of sodium carbonate are then slowly added during about 3 hours while maintaining the low temperature. The cooling is stopped and stirring continued for a further hour when gentle heat is applied until a temperature of about 70–75° C. is reached. The mixture is then allowed to cool, the cellulose derivative separated and washed, first with dilute acid and then with water. It has a very strong affinity for acid wool colours.

The phrase "basic compound of the ammonia type" is employed in the claims to mean only ammonia itself or substitution derivatives of ammonia wherein the hydrogen of the ammonia is wholly or partially substituted by organic radicles.

What I claim and desire to secure by Letters Patent is:—

1. Process for the manufacture of nitrogen-containing cellulose derivatives, comprising treating a hydroxy ester of cellulose with thionyl chloride and thereafter treating with ammonia.

2. Process for the manufacture of nitrogen-containing cellulose derivatives, comprising treating a hydroxy ester of cellulose with thionyl chloride and thereafter treating with a substituted ammonia.

3. Process for the manufacture of nitrogen-containing cellulose derivatives, comprising treating a hydroxy ether of cellulose with thionyl chloride and thereafter treating with ammonia.

4. Process for the manufacture of nitrogen-containing cellulose derivatives, comprising treating a hydroxy ether of cellulose with thionyl chloride and thereafter treating with a substituted ammonia.

5. Process for the manufacture of nitrogen-containing cellulose derivatives, comprising amidating a carboxy group of a cellulose derivative containing a carboxy group and treating the product with a hypohalite to convert the resulting acid amide group into a simple amino group.

6. Process for the manufacture of nitrogen-containing cellulose derivatives, comprising amidating a carboxy group of a cellulose derivative containing a carboxy group and treating the product with a hypochlorite to convert the resulting acid amide group into a simple amino group.

7. Process for the manufacture of nitrogen-containing cellulose derivatives, comprising halogenating a cellulose derivative containing a carboxy group, treating with ammonia and then with a hypochlorite so as to convert the resulting acid amide group into a simple amino group.

8. Process for the manufacture of nitrogen-containing cellulose derivatives, comprising reacting upon a substitution derivative of cellulose containing a hydroxy radicle in a substituent group with a basic compound of the ammonia type.

9. Process for the manufacture of nitrogen-containing cellulose derivatives, comprising reacting upon a hydroxy ether of cellulose with a basic compound of the ammonia type.

10. Process for the manufacture of nitrogen-containing cellulose derivatives, comprising reacting upon an ether of cellulose containing a free carboxyl group with a basic compound of the ammonia type.

11. Process for the manufacture of nitrogen-containing cellulose derivatives, comprising reacting upon a hydroxy ester of cellulose with a basic compound of the ammonia type.

12. Process for the manufacture of nitrogen-containing cellulose derivatives, comprising reacting upon an ester of cellulose containing a free carboxyl group with a basic compound of the ammonia type.

13. Process for the manufacture of nitrogen-containing cellulose derivatives, comprising halogenating a substitution derivative of cellulose containing a hydroxy radicle in a substituent group and thereafter treating the halogenated derivative with a basic compound of the ammonia type.

14. Process for the manufacture of nitrogen-containing cellulose derivatives, comprising reacting upon a substitution derivative of cellulose containing a hydroxy radicle in a substituent group with ammonia.

15. Process for the manufacture of nitrogen-containing cellulose derivatives, comprising reacting upon a substitution derivative of cellulose containing a carboxyl radicle in a substituent group with ammonia.

16. Process for the manufacture of nitrogen-containing cellulose derivatives, comprising reacting upon a substitution derivative of cellulose containing a hydroxy radicle in a substituent group with an organic amine containing hydrogen attached to the nitrogen.

17. Process for the manufacture of nitrogen-containing cellulose derivatives, comprising reacting upon a substitution derivative of cellulose containing a carboxy radicle in a substituent group with an organic amine containing hydrogen attached to the nitrogen.

18. Process for the manufacture of nitrogen-containing cellulose derivatives, comprising reacting upon a substitution derivative of cellulose containing a carboxy radicle in a substituent group with a primary amine.

19. Process for the manufacture of nitrogen-containing cellulose derivatives, comprising halogenating a substitution derivative of cellulose containing a hydroxy radicle in a substituent group and treating the product with ammonia.

20. Process for the manufacture of nitrogen-containing cellulose derivatives, comprising halogenating a substitution derivative of cellulose containing a hydroxy radicle in a substituent group and treating the product with an organic amine containing hydrogen attached to nitrogen.

21. Substitution derivatives of cellulose containing in substituent radicles the grouping

where $R_1$ and $R_2$ are hydrogen or organic radicles, said grouping being directly attached to a carbonyl grouping.

22. Esters of cellulose containing in substituent radicles the grouping

where $R_1$ and $R_2$ are hydrogen or organic radicles, said grouping being directly attached to a carbonyl grouping.

23. Ethers of cellulose containing in substituent radicles the grouping

where $R_1$ and $R_2$ are hydrogen or organic radicles, said grouping being directly attached to a carbonyl grouping.

24. Carboxylic esters of cellulose containing in substituent groups the grouping

where $R_1$ and $R_2$ are hydrogen or organic radicles, such grouping being linked to the cellulose residue only by carbon atoms and an oxygen atom.

HENRY DREYFUS.